United States Patent
Kreiner et al.

(10) Patent No.: US 9,832,802 B2
(45) Date of Patent: Nov. 28, 2017

(54) FACILITATING COMMUNICATIONS VIA A MOBILE INTERNET-ENABLED CONNECTION INTERFACE

(71) Applicant: AT&T Intellectual Property I, L.P., Atlanta, GA (US)

(72) Inventors: Barrett M. Kreiner, Woodstock, GA (US); Randall S. Spell, Douglasville, GA (US); Ryan Schaub, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 166 days.

(21) Appl. No.: 14/969,126

(22) Filed: Dec. 15, 2015

(65) Prior Publication Data

US 2017/0171896 A1    Jun. 15, 2017

(51) Int. Cl.
*H04L 29/06*   (2006.01)
*H04W 76/02*   (2009.01)
*H04W 72/04*   (2009.01)
*H04L 9/08*   (2006.01)
*H04W 84/12*   (2009.01)

(52) U.S. Cl.
CPC ......... *H04W 76/023* (2013.01); *H04L 9/0861* (2013.01); *H04L 69/18* (2013.01); *H04W 72/048* (2013.01); *H04W 76/026* (2013.01); *H04W 84/12* (2013.01)

(58) Field of Classification Search
CPC .............................. H04L 9/0861; H04L 9/088
See application file for complete search history.

(56) References Cited

U.S. PATENT DOCUMENTS

| | | | |
|---|---|---|---|
| 7,926,054 | B2 | 4/2011 | Sonderegger et al. |
| 8,443,071 | B2 | 5/2013 | Lu et al. |
| 8,682,957 | B2 | 3/2014 | Elson et al. |
| 8,726,298 | B1 | 5/2014 | Desai et al. |

(Continued)

OTHER PUBLICATIONS

Vugt, "Managing PCI devices in virtual machines", http://searchservervirtualization.techtarget.com/tip/Managing-PCI-devices-in-virtual-mach . . . Retrieved on Sep. 11, 2015, 7 pages.

(Continued)

*Primary Examiner* — Ali Shayanfar
(74) *Attorney, Agent, or Firm* — Amin, Turocy & Watson, LLP

(57) ABSTRACT

Apparatus, methods and systems facilitating communications via a mobile internet-enabled connection interface are provided. One apparatus is configured to perform various operations, including detecting a wired connection with a first device coupled to a physical port of physical ports of the apparatus; and determining information indicative of a service provided via a second device, wherein the first device is a device configured to communicate with a device at a same location of the first device and to whom the first device is connected within a local area network at the same location of the first device and the device. The operations also include facilitating the establishment of a communication path over a network between the apparatus and the second device for service provisioning between the second device and the first device, wherein the second device is located at a different location from the first device.

17 Claims, 10 Drawing Sheets

(56) References Cited

U.S. PATENT DOCUMENTS

| | | | |
|---|---|---|---|
| 8,909,767 B2 | 12/2014 | Sunkara et al. | |
| 8,924,608 B2 | 12/2014 | Dabbiere | |
| 9,489,832 B2 * | 11/2016 | Nair | G08C 17/02 |
| 9,589,312 B2 * | 3/2017 | Poddar | G06T 1/60 |
| 9,667,414 B1 * | 5/2017 | Brandwine | H04L 9/0819 |
| 2010/0142421 A1 * | 6/2010 | Schlicht | H04W 4/20 |
| | | | 370/310 |
| 2011/0251807 A1 * | 10/2011 | Rada | G01D 4/00 |
| | | | 702/61 |
| 2012/0050066 A1 * | 3/2012 | Pendse | G06F 19/3406 |
| | | | 340/870.07 |
| 2013/0218769 A1 * | 8/2013 | Pourfallah | G06Q 20/10 |
| | | | 705/44 |
| 2014/0086177 A1 * | 3/2014 | Adjakple | H04W 12/08 |
| | | | 370/329 |
| 2014/0108665 A1 * | 4/2014 | Arora | H04L 67/141 |
| | | | 709/227 |
| 2014/0195598 A1 | 7/2014 | Prupis et al. | |
| 2014/0196137 A1 | 7/2014 | Schwebke et al. | |
| 2014/0250240 A1 | 9/2014 | Schell et al. | |
| 2014/0325048 A1 | 10/2014 | Benchorin et al. | |
| 2015/0026343 A1 | 1/2015 | Borges et al. | |
| 2015/0033078 A1 * | 1/2015 | Wintergerst | G06F 11/362 |
| | | | 714/38.1 |
| 2015/0142919 A1 | 5/2015 | Lee et al. | |
| 2015/0304279 A1 | 10/2015 | Bui et al. | |
| 2016/0234244 A1 * | 8/2016 | Mehta | H04L 63/1433 |
| 2017/0171896 A1 * | 6/2017 | Kreiner | H04W 76/023 |

OTHER PUBLICATIONS

"Persistent Disks" Compute Engine, Google Cloud Platform, https://cloud.google.com/compute/docs/disks/persistent-disks. Retrieved on Sep. 11, 2015, 26 pages.

Safarini, "Technology Implementation of Computer Hardware in the Virtual Machines", International Journal of Advanced Research in Computer and Communication Engineering, Apr. 2014, pp. 6299-6302, vol. 3, Issue 4, IJARCCE, 4 pages.

"Virtual Machine Hardware, Options, and Resources Available to vSphere Virtual Machines", https://pubs.vmware.com/vsphere-4-esx-vcenter/topic/com.vmware.vsphere.vmadmin.doc. . . Retrieved on Sep. 11, 2015, 5 pages.

* cited by examiner

Native Driver Embedding in OS instance
Driver has to be installed in OS, less secure Docker Driver (hybrid Native/Hypervisor)
Installed in shared OS kernel, very secure Bare Metal Driver Hypervisor Driver
Hypervisor handles virtualization, very secure

FACILITATING COMMUNICATIONS VIA A MOBILE INTERNET-ENABLED CONNECTION INTERFACE

TECHNICAL FIELD

The subject disclosure relates generally to communications systems, and, for example, to systems, apparatuses and/or methods of facilitating communications for physical devices via a mobile internet-enabled connection interface in communications systems.

BACKGROUND

Physical computers (e.g., tablets, phones, game consoles, set top boxes (STBs), digital video recorders (DVRs), Blu-Ray devices, Smart TVs and casters) typically have directly connected peripherals via one or more wired or wireless interfaces to facilitate communications. The different types of communications that can be facilitated include, but are not limited to, those associated with one or more different protocols. For example, communication protocols (e.g., Bluetooth, Wireless Fidelity (Wi-Fi), serial, parallel, universal serial bus (USB), FireWire, Ethernet, Secure Digital Input Output (SDIO)); storage protocols (e.g., enhanced Intelligent Drive Electronics ([E]IDE)/Small Computer System Interface (SCSI)/external serial advanced technology attachment ([E]SATA), secure digital, extended capacity, high capacity (SD[XC|HC])); display protocols (e.g., video[+Audio] video graphics array (VGA), Digital Visual interface (DVI), High-Definition Multimedia Interface (HDMI), Wireless Display (WiDi)); and audio protocols (e.g., audio jacks in/out) can be facilitated. In addition, Internet of Things (IoT) protocols for various devices (e.g., appliances, sensors, monitors) can be facilitated. Logical (e.g., virtual/cloud network) machines/computers lack these physical connectors. Some remote clients can bring some interfaces with the client connection; however, the interfaces are typically not persistent past the client connection. Further, peripheral software typically expects peripherals to at least appear be directly connected.

Computer devices such as smart phones that may need direct connection at times cannot be utilized on cloud network computers. This can restrict adoption of cloud network services for consumers.

DETAILED DESCRIPTION

Figure 1:
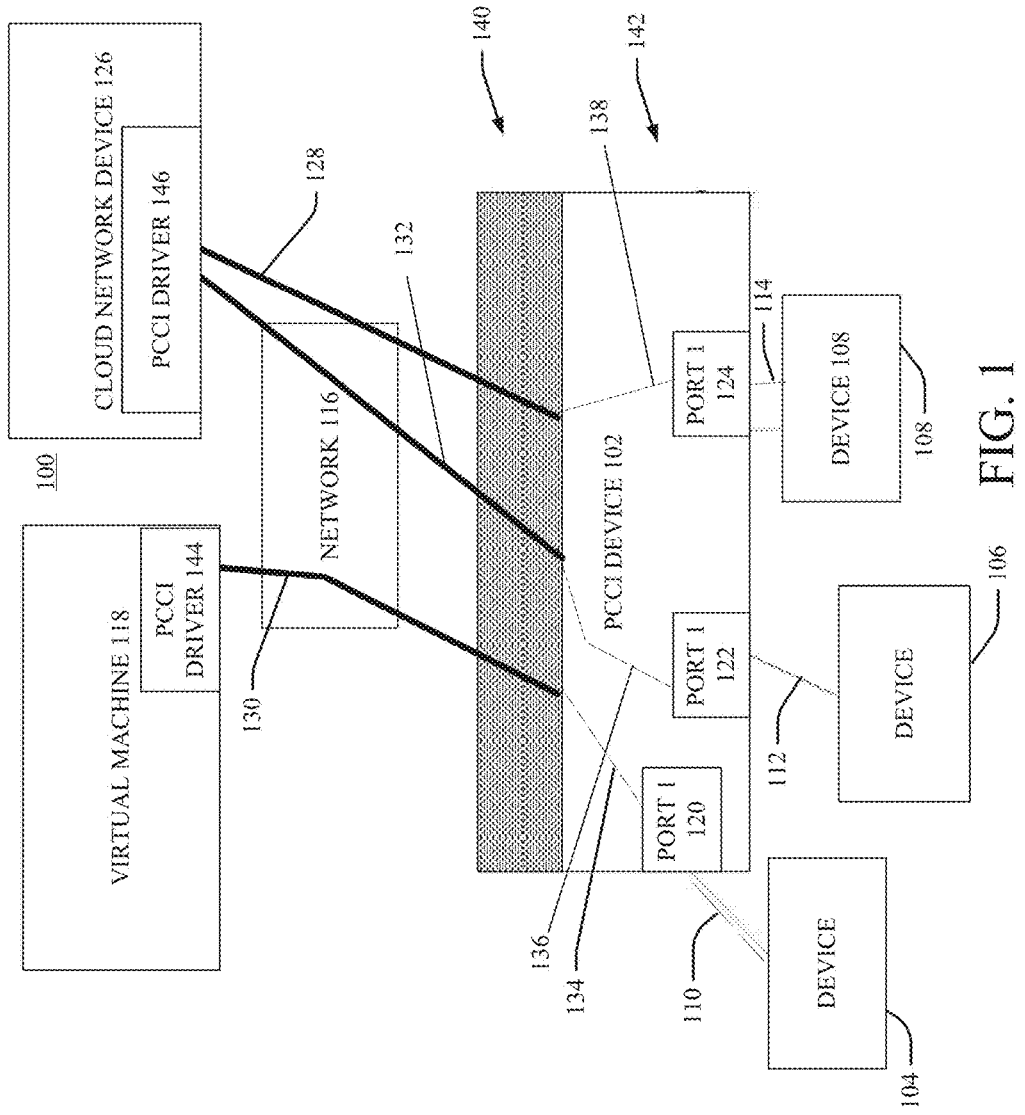
FIG. 1 illustrates an example schematic diagram of a system that facilitates communications between physical devices and virtual components in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Physical computers (e.g., tablets, phones, game consoles, STBs, DVRs, BluRay devices, Smart TVs and casters) typically have directly connected peripherals via one or more wired or wireless interfaces to facilitate communications. The different types of communications that can be facilitated include, but are not limited to, those associated with one or more different protocols. For example, communication protocols (e.g., Bluetooth, Wi-Fi, serial, parallel, USB, FireWire, Ethernet, SDIO); storage protocols (e.g., [E]IDE/SCSI[E]SATA, SD[XC|HC]); display protocols (e.g., video[+Audio] VGA, DVI, HDMI, WiDi); and audio protocols (e.g., audio jacks in/out) can be facilitated. In addition, IoT protocols for various devices (e.g., appliances, sensors, monitors) can be facilitated. Logical (e.g., virtual/cloud network) machines/computers lack these physical connectors. Some remote clients can bring some interfaces with the client connection; however, the interfaces are typically not persistent past the client connection. Further, peripheral software typically expects peripherals to at least appear be directly connected.

Typically, devices (e.g., peripheral devices) and/or host device drivers have to be implicitly trusted; however connectivity opens the local network or host device to attack vectors through the devices. Devices are also open to hacking from the connectivity side, and not all devices are inherently secure. For example, IoT devices, in particular, connected to a network can have privacy and security concerns.

As more devices become Internet Protocol (IP)-enabled through wireless connectivity and more the intelligence is stored in the cloud network, more flexibility to device interface enhances (hardware or software) to cloud network substantiation of these devices can be useful. Ideally these cloud network interfaces will be standardized in much the same way they are today on devices, such as USB, VGA, HDMI, etc. Establishing hardware/software application programming interfaces (APIs) on cloud networks for IP-connected devices can greatly increase the capabilities and flexibilities of these devices.

Various devices that are currently in use are configured in a manner such that the devices need to physically connect to local computers. With the migration to IoT devices and cloud network-hosting solutions, one limitation is that the IoT devices cannot make a physical connection to a cloud network-hosted site desktop or other device in many cases. For example, a USB storage device can be provided at a home location; however, the USB storage device cannot be physically plugged into and/or connected to an Amazon web service cloud node. Similarly, many devices are designed to utilize a physical connection to another device and in many instances in which cloud-based applications are used with the device, there is no ability to have a physical connection for the device.

In some cases, storage or printers can be brought to the remote desktop client but certain types of scanners or an iPad or an iPhone, cannot be brought as it is configured to be physically connected when using iTunes, for example. However, there is no interface so there is no ability to connect an iPad to a cloud network-hosted node.

Additionally, with cloud network storage, throughways are poked to allow connections from devices to the cloud node, which can result in a security problem. This is especially a potential problem for IoT devices, which are oftentimes intentionally designed to be lightweight and rely on heavy duty storage through connection with other devices (e.g., USB storage devices).

Based on the foregoing, embodiments described herein can include a PCCI device, which can be a combination hardware and software component that can provide connectivity for one or more peripheral devices to one or more cloud network host devices such that the cloud network host device appears to have the PCCI device locally attached. As such, the PCCI can be configured to provide an interface between a physical device (e.g., USB device) and one or more containers and/or one or more virtual machines.

In one embodiment, a method is provided. The method can include: associating, by a device comprising a processor, the device with a user account via a directory service of a network, wherein remote device instances of host devices are established via the directory service and associated with the user account; determining, by the device, that a peripheral device is connected to a port of the device; receiving, by the device, information indicative of a peripheral device selection of a host device of the host devices to which to attach the peripheral device; and generating, by the device, a communication path between the device and a device driver associated with the host device resulting in the host device determining the device is locally attached to the host device.

In one embodiment, an apparatus is provided. The apparatus can include a processor; and a memory that stores executable instructions that, when executed by the processor, facilitate performance of operations. The operations can include: detecting a wired connection with a first device coupled to a physical port of physical ports of the apparatus; and determining information indicative of a service provided via a second device, wherein the first device is configured to communicate with a device at a same location of the first device and to which the first device is connected via a first network device of a local area network at the same location of the first device and the device. The operations can also include facilitating the establishment of a communication path via a second network device of a network between the apparatus and the second device for service provisioning between the second device and the first device, wherein the second device is located at a different location from the first device, and the network operates according to a different communication protocol other than that of the local area network, and wherein, as a result of the facilitating establishment of the wireless communication path, the first device and the second device become configured to detect one another as being locally attached to one another.

In one embodiment, a machine-readable storage medium is provided. The machine-readable storage medium can comprise executable instructions that, when executed by a processor, facilitate performance of operations. The operations can comprise: communicatively coupling a physical device with a first virtual machine of virtual machines located remote from the physical device, wherein the coupling causes the first virtual machine to be configured to detect the physical device as locally attached to the first virtual machine; generating an encrypted communication path to the first virtual machine; and facilitating, via a network device of a network, a communication between the physical device and the first virtual machine.

One or more of the embodiments described herein can connect multiple devices to multiple cloud network host devices while keeping the content isolated and/or can (where appropriate) share or switch peripheral devices between multiple cloud network host devices. In various embodiments, sharing of devices and/or additional function systems can be facilitated via the cloud network environment because the hardware or software does not need to be in a specific physical location or server and the ability to share these objects between devices is then possible. In one or more embodiments, devices can subscribe to different cloud network services. Additionally, devices are not limited by the number of ports on the device. The type of ports could be any of the physical ports on devices today (e.g., USB, HDMI, VGA, Audio, Microphone, SATA, Bluetooth, WiFi, Cellular, RFID, etc.) and software APIs (e.g., Windows operating system (OS), JAVAOS, iOS, Android OS and/or Linux OS).

FIG. 1 illustrates an example schematic diagram of a system that facilitates communications between physical devices and virtual components in accordance with one or more embodiments described herein. The system 100 can include a PCCI device 102, one or more devices 104, 106, 108 having one or more structures for physical connectivity between the PCCI device 102 and the respective one or more devices 104, 106, 108, a virtual machine 118 and/or a cloud network device 126. In one embodiment, as shown, the PCCI device 102 and the one or more devices 104, 106, 108 can be electrically and communicatively coupled to one another via respective connection apparatus 110, 112, 114 of the one or more devices 104, 106, 108 to one or more ports or other connections to/from the PCCI device 102 while the PCCI device 102 and the virtual machine 118 or the cloud network device 126 can be electrically and/or communicatively coupled to one another via the network 116. By way of example, but not limitation, the connection apparatus 110, 112, 114 can be or include a cable (e.g., HDMI cable, USB cable). By way of another example, but not limitation, the connection apparatus can be a local area network communication channel (not shown) (e.g., wireless USB).

The devices 104, 106, 108 can include hardware and/or a combination of hardware and software and can perform any number of different functions. In various embodiments, the devices 104, 106, 108 can include physical devices such as laptops, mobile phones, scanners, printers, tablets or the like, that include one or more ports (not shown) over which a connection can be made to provide a physical connection to one or more ports 120, 122, 124 of the PCCI device 102. For example, the connection apparatus 110 can be electronic equipment configured to connect USB ports of the device 104 and PCCI device 102. The type of ports can include, but is not limited to, USB, HDMI, VGA, Audio, Microphone, SATA, Bluetooth, WiFi, Cellular, RFID ports and/or ports associated with software APIs for Windows, JAVA, iOS, Android, Linux and the like.

As described, the PCCI device 102 can be a physical component having one or more ports and that include hardware and/or software components. The hardware and/or software component of the PCCI device 102 can be configured to provide connectivity for one or more devices that are peripheral devices (devices 104, 106, 108) to one or more virtual machines (e.g., virtual machine 118) or cloud network host devices (or cloud network devices such as cloud network device 126) such that the virtual machine or the cloud network host device appears to have the one or more devices locally attached.

In one embodiment, the virtual machine or the cloud network host device (or the cloud network device) can view the PCCI device 102 as if the PCCI device 102 is locally attached to the virtual machine, cloud network host device (or the cloud network device). For example, a driver (e.g., PCCI driver 144 or PCI driver 146) for the PCCI device 102 can be installed at the particular virtual machine and/or cloud network host device or cloud network device to cause the PCCI device 102 to appear as if the PCCI device 102 (or, in some embodiments, the peripheral device connected to the PCCI device 102) is locally attached to the virtual machine or the cloud network host device (or the cloud network device).

At the PCCI device 102, the PCCI device 102, which is connected to the (wireless, wired) local network and that connects to one or more devices (e.g., devices 104, 106, 108), which are peripherals, can build a persistent device-to-cloud network host device connection (or PCCI device-to-virtual machine network connection) that is encrypted and protected. In various embodiments, the local network cannot see the peripheral and only sees the PCCI device 102. By way of example, but not limitation, the PCCI device 102 can be connected to a cloud network host device by having a physical indication (e.g., display, port indicators, audio) or a logical indication (e.g., Web or services interface) that is connected to one or more cloud hosts.

The PCCI device 102 requires no specific port rules and therefore adaptive connectivity is facilitated. Encrypted communications are facilitated via the PCCI device 102. In various embodiments, the peripheral does not see the local network and does not require a host device driver on a local computer.

At the physical location at which the devices 104, 106, 108 are located, the PCCI device 102 that is connected to the local network (e.g., wireless, wired) and that connects to one or more devices that are peripherals to the PCCI device 102 can build a persistent device-to-cloud network host device connection that is encrypted (e.g., connections 128, 130, 132) and therefore over which communications are protected. In some embodiments, a first portion 142 of the PCCI device 102 can receive and/or transmit information over unencrypted paths 134, 136, 138 and a second portion 140 of the PCCI device 102 can generate the encrypted communication path between the PCCI device 102 and the drivers 144, 146 of the virtual machine 118 and cloud network device 126, respectively. As shown, the PCCI device 102 can facilitate one or more devices (e.g., devices 106, 108) sharing access to a cloud network device (e.g., cloud network device 126).

In various embodiments, the local network cannot detect the peripheral devices (e.g., devices 104, 106, 108) and only detects the PCCI device 102. In some embodiments, the PCCI device 102 requires no specific port rules and therefore adaptive connectivity is facilitated. Encrypted communications are facilitated via the PCCI device 102. In various embodiments, any number of different types of security protocols can be provided.

As shown, the PCCI device 102 can connect multiple devices (e.g., one or more of devices 104, 106, 108) to a virtual machine 118 or one or more cloud network host devices (or cloud network devices such as cloud network device 126) while keeping the content communicated over the communication path between the PCCI device 102 and the virtual machine 118 or one or more cloud network host devices (or cloud network device 126) encrypted. The encrypted content can also be isolated from the devices 104, 106, 108 such that the users of the devices 104, 106, 108 do not have access to the encrypted content.

In some embodiments, the PCCI device 102 can, where appropriate, share or switch between two or more different cloud network host devices, the devices 104, 106, 108 that are peripherals. In particular, cloud network hosting includes employing one or more online virtual servers that can be created, modified, and/or destroyed on demand. Cloud network servers are allocated resources like CPU cores and memory by the physical server that host devices the cloud network server on and can be configured with any one of different OSs and accompanying software.

In various embodiments, an OS, Hypervisor, or Docker container plug-in can be employed to expose the PCCI device 102 as a native device to the cloud network device 126 or the virtual machine 118. In particular, the PCCI drivers 144, 146 can facilitate exposure of the PCCI device 102 as a native device to the cloud network device 126 or a virtual machine 118. This provides the infrastructure to find the cloud network host device (or cloud network device 126).

In various embodiments, the cloud network devices can include, but are not limited to, A T &T Integrated Cloud (AIC) devices, Amazon Web Services (AWS) devices, Azure devices, Google Cloud devices or the like. In some embodiments, the cloud network devices are physical sites at which virtualized function are executed and/or are configured to be executed. By way of example, but not limitation, the cloud network devices or virtual machines can be servers, a collection of other devices or any number of different devices or configurations of devices to which the devices 104, 106, 108 can connect via the PCCI device 102 to access the functionality of one of more of the cloud network devices or virtual machines. In some embodiments, the cloud network in which the cloud network device is located is a collection of one or more computers or servers connected to a network (e.g., the Internet) that is accessible and therefore available for use by an end device (e.g., device 104, 106, 108). The devices 104, 106, 108 can access the computer or server that is part of the cloud network through paid leasing or as part of a software service typically.

A cloud network-based service can be any number of different services including, but not limited to, web hosting, file sharing, software distribution or the like. For example, one or more different cloud networks or cloud network devices within a cloud network can provide database management, virtual servers, web application management, email management, file systems, archival storage, analytics, application testing and/or large scale data transport.

Establishing hardware and/or software APIs on cloud network devices for IP-connected devices can greatly increase the capabilities and flexibilities of these devices (e.g., one or more of devices 104, 106, 108). Specifically an IP-connected device (e.g., one or more of devices 104, 106, 108 that is IP-connected to a cloud network device) can become very low-cost to manufacture and/or use since the additional functions and capabilities can be shared resources from the virtual machine 118 or the cloud network device 126.

In one embodiment, for example, the device 104 can be a connected alarm system that can access logic at the cloud network device 126 in the cloud network that can connect to a camera on the street (which from the system perspective can appear to be a USB camera). This makes it easier for older devices to expand functionality by eliminating the need for new interfaces and enables new devices to interface to older devices. The sharing of devices and additional function systems can be provided via embodiments described herein employing the cloud network environment because the hardware or software does not need to be in a specific physical location or server and the ability to share these objects between end user devices is then possible. For example, the street camera can be connected to multiple homeowners' alarm systems.

The standardized interface associated with the PCCI device 102 embodiments described herein does not require the camera or the systems to know where each is located. In various embodiments described herein, for the alarm systems, the camera appears to be connected to the system with a USB cable and similarly the camera thinks the camera is working through a physical USB cable.

In various embodiments, devices (e.g., device 104) can subscribe to one or more different cloud network services, which can allow other devices to easily find the device (e.g., device 104) and install the device. The cloud network can manage driver updates so other devices would not need to download and install new drivers. Additionally, devices (e.g., device 104) would not be limited to the number of ports physically provided on the device at time of manufacture.

In various embodiments, the PCCI device 102 can connect multiple devices to multiple cloud network host devices (or multiple cloud network devices such as cloud network device 126) while keeping the content isolated and/or can, where appropriate, share or switch peripherals between multiple cloud network host devices or cloud network devices. In various embodiments, an OS, Hypervisor, or Docker container plug-in can be employed to expose the PCCI device 102 as a native device to the cloud network host device. This provides the infrastructure to find the cloud network host device regardless of which cloud network it's hosted in (e.g., AIC, AWS, Azure, Google Cloud, etc).

Figure 2:
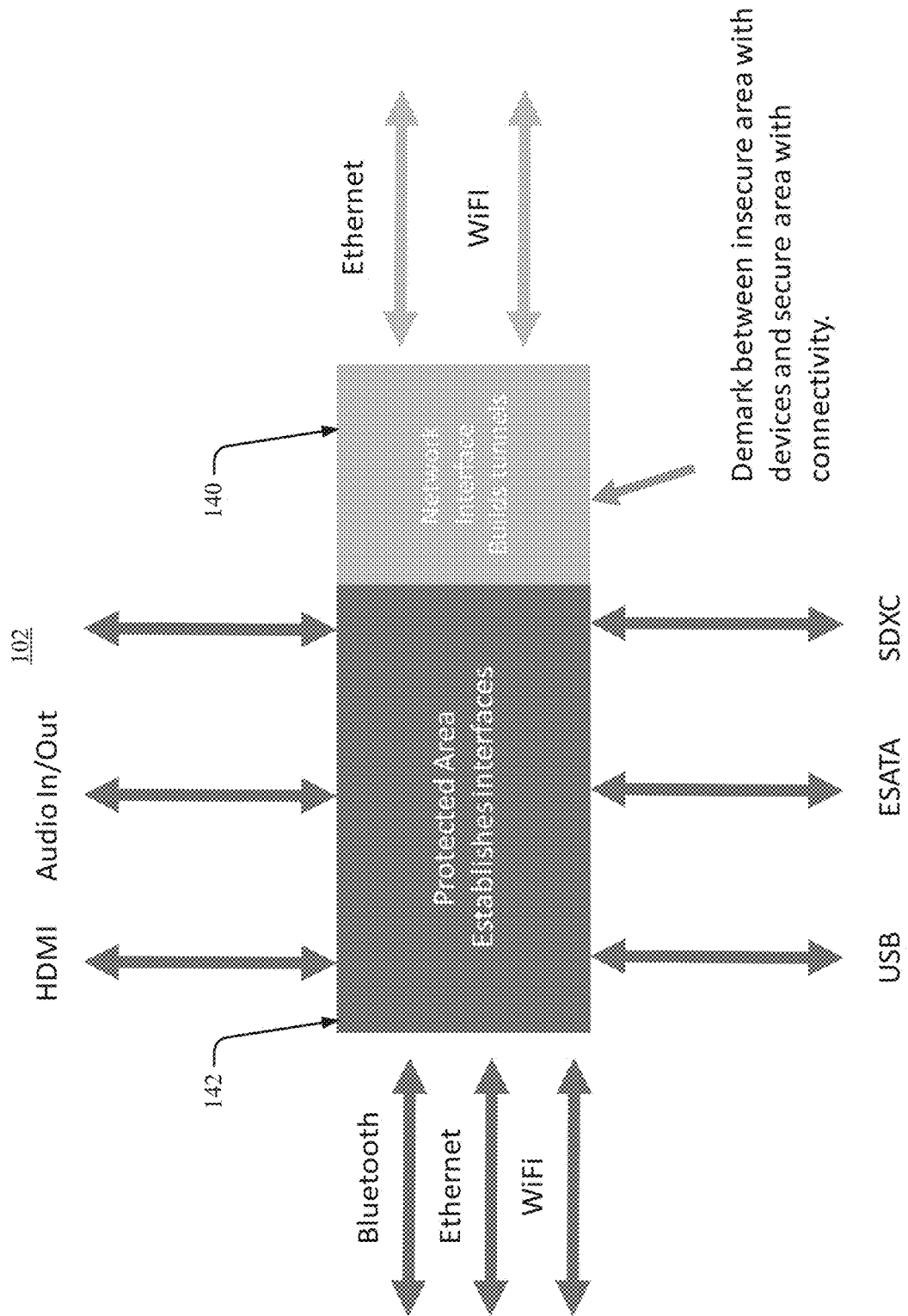
FIG. 2 illustrates an example schematic diagram of a Peripheral Cloud Connectable Interface (PCCI) device that facilitates communications between physical devices and virtual components in accordance with one or more embodiments described herein.

FIG. 2 illustrates an example schematic diagram of a PCCI device that facilitates communications between physical devices and virtual components in accordance with one or more embodiments described herein. Repetitive description of like elements employed in other embodiments described herein is omitted for sake of brevity.

As shown in FIG. 2, in one or more embodiments described herein, the PCCI device 102 can be a stand alone device or can be incorporated into and/or communicatively coupled to another device such as a router or a residential gateway. The PCCI device 102 can connect one or more devices (e.g., devices 104, 106, 108), which are configured to require a physical interface/connection to a computer for communication, to a remote software container (or cloud network device) or to a virtual machine.

The PCCI device 102 can build, encrypt and tunnel the communications. In various embodiments, connection from a device 104 (e.g., a scanner) to a cloud network device (e.g., a cloud network virtual desktop) can occur such that the communication and security between the device 104 and the cloud network device (e.g., cloud network device 126) is handled by the PCCI device 102, via the PCCI driver (e.g., PCCI driver 144 or PCCI driver 146) and the communication is privately encrypted thereby significantly reducing the possibility of attack.

Ethernet, USB, Wi-Fi and Bluetooth are common connections that are examples of peripherals that can provide a physical connection between the device (e.g., device 104) and the PCCI device 102. As shown in FIG. 2, other connections can be connected also from the PCCI device 102. For example, connections such as USB to video or a USB to HDMI or a USB card reader connection can be facilitated. These connections can be the types of connections input at the PCCI device 102. Then the PCCI device 102 is connected to multiple other components, devices or the like (e.g., cloud devices, containers on the output from the PCCI device 102. For example, in embodiments in which the device 104 is a scanner that is typically connected to a computer for operation, based on one or more embodiments described herein, the device can be connected to a hosted application in a container or connected to a Windows virtual desktop that has scanner software installed. As such, the scanner can be connected to one or more devices with scanner software to perform different scanner functions although the scanner is not actually physically connected to the devices.

In some embodiments, sharing of one or more devices 104, 106, 108 across multiple virtual machines associated with a cloud network can be performed via the PCCI device 102. For example, notwithstanding a particular device 104 may be configured such that the device 104 must appear to be locally attached to a component to interact with the component, the embodiments described herein can enable device sharing across multiple virtual machines with a physical device. As such, one device can be connected to numerous other devices.

In some embodiments, the PCCI device 102 can be employed to perform yet another embodiment of device sharing. For example, if there are a defined number of USB device ports, sharing can be performed extensively. For example, data associated with the first port of the USB device can be associated with a first container, data associated with the second port of the USB device can be associated with two different virtual machines (and, as such, the virtual machines share the second USB port) and data associated with the third port can be associated with another device hub that can split the data even further. These types of device sharing scenarios are very useful because the cloud network is becoming more and more prolific; however, physical devices continue to exist. Thus, one or more embodiments described herein can bring physical devices together with virtual machines and cloud networks.

In some embodiments, permissions for one or more containers can be specified to provide different types of functionality able to be accessed by one or more devices 104, 106, 108 or to provide access to one or more of devices 104, 106, 108. For example, each or one or more devices (e.g., device 104) that can consume information can also have different levels of permitted access. By way of example, but not limitation, a video device can have permissions such that the video device can receive video for part of a day versus an entire day. As another example, another device 104 (e.g., a webcam device) can be controlled based on permissions by one or more devices. For example, a first mobile phone can be configured with the ability to turn on the webcam device while a second mobile phone can be configured only with permission to view the webcam. So one device can control the webcam while another device can consume the webcam. As such, the devices have different privileges (e.g., different access). As another example, the first mobile phone may only have access to the webcam during business hours while the second mobile device may have access anytime.

In one or more of these embodiments, the container for the cloud network device can control the action permitted via the permissions. For example, by permission, a particular container can be the controller of the device while another container can have permission to only consume the device. Thus, there can be more finely-grained control within the concept of sharing.

As another example, a USB storage device can be shared between three containers. A first container can have a first type of access (e.g., full read/write access) to that particular USB storage device connected to the PCCI device 102, whereas the other two containers may only see the USB storage as read only storage. These permissions can be enforced at the virtual hardware level that is being offered and therefore the two containers that have read only access cannot gain write access to the USB storage device unless permission is expressly provided or modified for those two containers that had read only access. Since the two containers cannot gain write access to the USB storage device, the two containers cannot infect the USB storage with a virus or other malware or code. In some embodiments, the control that allows the permissions to be changed is in a directory service component (e.g., directory service component 310 of FIG. 3). The directory service component 310 can allow selection of which devices can access which containers (or vice versa). As such, this embodiment is a read/write (control versus consumer) example with permissions. In various embodiments, the directory service component is a component including a data store that can also provide information and/or allow end users of devices 104, 106, 108 to locate cloud network applications or other resources.

Other embodiments are also possible, for example, that provide for sharing. By way of example, but not limitation, an internet access doorbell device can be an example of a peripheral device connected to the PCCI device 102. No matter where a particular mobile phone is in the world, if someone rings a home doorbell associated with the mobile phone, there can be a video camera and as long as there is an internet connection, the home doorbell, which can be connected to the PCCI device 102 can generate information that can be received by the mobile phone and notify the user of the mobile phone that someone is ringing the doorbell. This embodiment can be further extended to set up control such that if a particular entity is not at home or if the doorbell device rings at certain times (e.g., evening hours), the notification generated by the doorbell device and transmitted via the PCCI device 102 can be transmitted to a service (e.g., a door answering service within which a third-party human can receive the notification and potentially screen the person ringing the doorbell). In some embodiments, a live voice can be transferred from the homeowner to the security company to the police officer and the police officer can talk to a home invasion perpetrator through the system. Accordingly, the combination of camera and two-way voice communication control over an environment can be facilitated. This embodiment, in particular can allow a police officer to take control of the home automation and turn on one or more lights in the home remotely or take other action.

Another example includes a device that provides motion detection that is coupled to the PCCI device 102. The permission can be setup such that the device does motion detection and if there is motion detected and/or a glass break then perhaps a notification or call is transferred to 911 by the PCCI device 102. The physical routing can be performed by handing off to another container (e.g., 911 container). These embodiments can be particularly useful as the control can be setup or modified in advance of any incident or peripheral device operation.

The embodiments described herein can apply to applications beyond those related to security, however. For example, the use of the PCCI device 102 can also facilitate diagnostics, connectivity, etc. By way of another example, but not limitation, the PCCI device 102 can be employed for information technology (IT) remote help services. For example, in embodiments in which the device 104 (e.g., mobile phone, laptop) cannot be physically connected to a diagnostic computer, at the location of the device 104, the device 104 can be physically connected to the PCCI device 102 and the device 104 can appear to the diagnostic computer via communication between the PCCI device 102 and the diagnostic computer over a network (e.g, network 116 of FIG. 1, for example). In embodiments in which the device 104 is an iPhone, and the diagnostic computer is an iPhone or iPad, the ITunes application can be employed to evaluate the issue that may be occurring with the device 104.

In some embodiments, the device 104 can be a mobile phone (e.g., iPhone) connected to the USB port of the PCCI device 102 and a laptop or other computer (e.g., computer having a Windows desktop) at another location within the same home in which the device 104 is located can appear to be physically connected to the device 104 since the PCCI device 102 can be electrically and/or communicatively coupled to the laptop or other computer. As such, in some embodiments, the PCCI device 102 can be physically connected to device 104 and also maintain a connection to another physical device at or within a defined distance of the same location of the PCCI device 102 via a network such as network 116 coupled between the PCCI device 102 and the laptop or other computer by way of the PCCI device 102 creating a tunnel between the device 104 and the driver at the laptop or other computer.

In the embodiment in which the PCCI device 102 and the laptop or other computer are coupled by way of the PCCI device 102 creating a tunnel between the device 104 and the driver at the laptop or other computer, this connection is significant because there is then a private network tunnel between the device 104 and the laptop or computer, and the laptop or computer can be relocated to other areas. To have the same privacy employing a virtual private network (VPN), the laptop or computer would need to be physically connected to the PCCI device 102. There are many different combinations possible to create different embodiments, all of which are envisaged herein.

For example, in some embodiments, if the device 104 is a personal computer (PC) and there is a desire to connect a USB video device to the PCCI device 102 and connect the USB video device of the PC to a television, for example, this can typically be provided without need for services such as Chromecast because the PCCI device 102 can be connected to the USB video device and thereafter any device (even cloud network devices) can be screen cast to the physical television.

Figure 3:
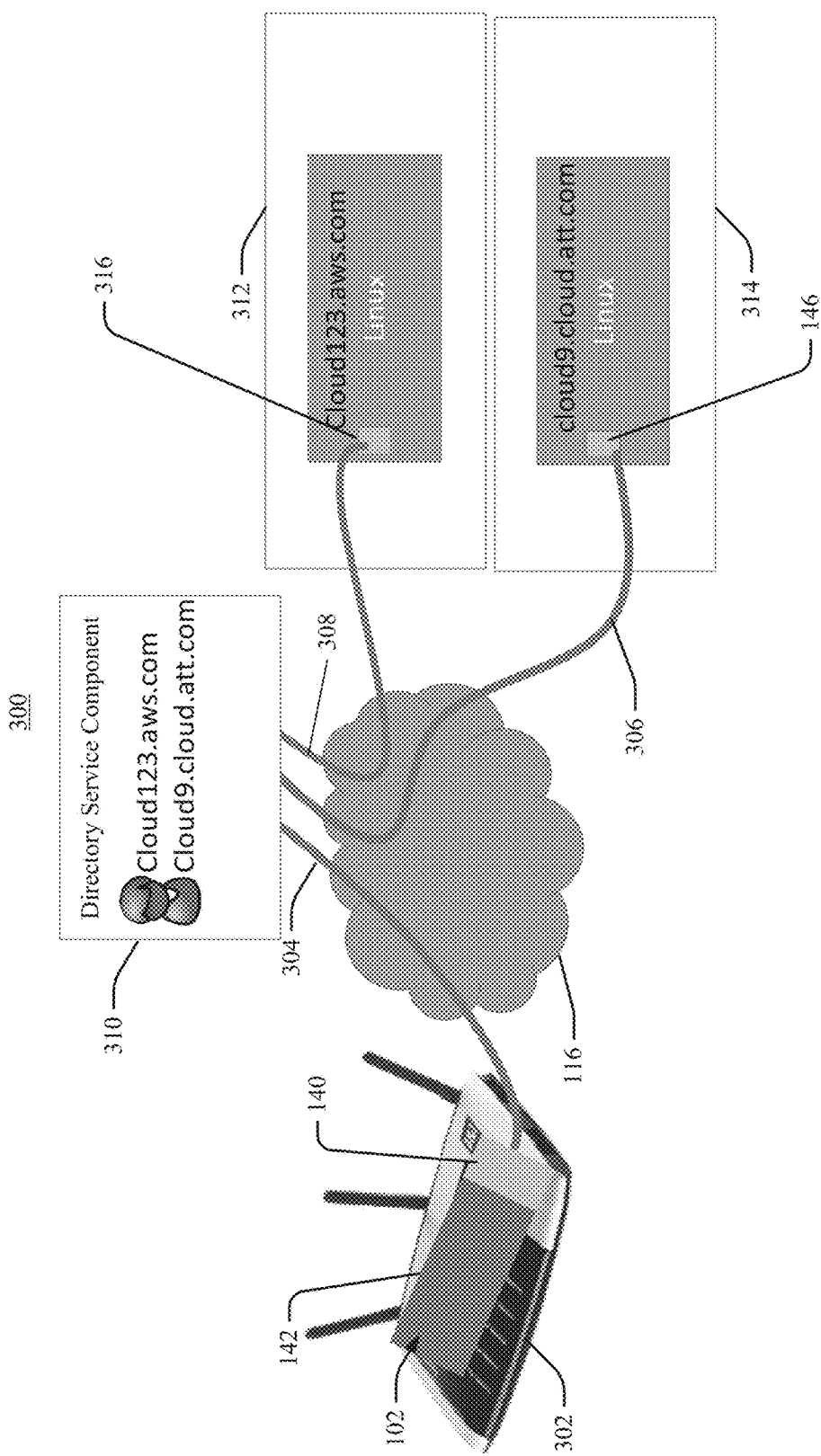
FIG. 3 illustrates an example schematic diagram of a system including the PCCI device and that facilitates communications between physical devices and virtual components in accordance with one or more embodiments described herein.

FIG. 3 illustrates an example schematic diagram of a system including the PCCI device and that facilitates communications between physical devices and virtual components in accordance with one or more embodiments described herein. With reference to FIG. 3, the PCCI device 102 can connect a device (e.g., device 104 of FIG. 4) to one or more different containers. For example, the PCCI device 102 can build the appropriate tunnels to the containers 312, 314. In the containers 312, 314 or in the host devices, PCCI drivers 316, 146 exist, because physical devices are seen as drivers by the containers 312, 314, for example. There are several ways attacks can occur. For example, there can be drivers that virtualize the devices and they show up physically to the operating system (OS) associated with the container as if they are real.

In FIG. 3, one or more cloud network instances 312, 314 for end users can be established and enabled with the PCCI device 102. Associations with a user account in the directory service component 310 can be provided. The PCCI device 102 can be installed on the network, which can contact the directory service and associate with the end user account associated with a device connected to the PCCI device 102.

Figure 4:
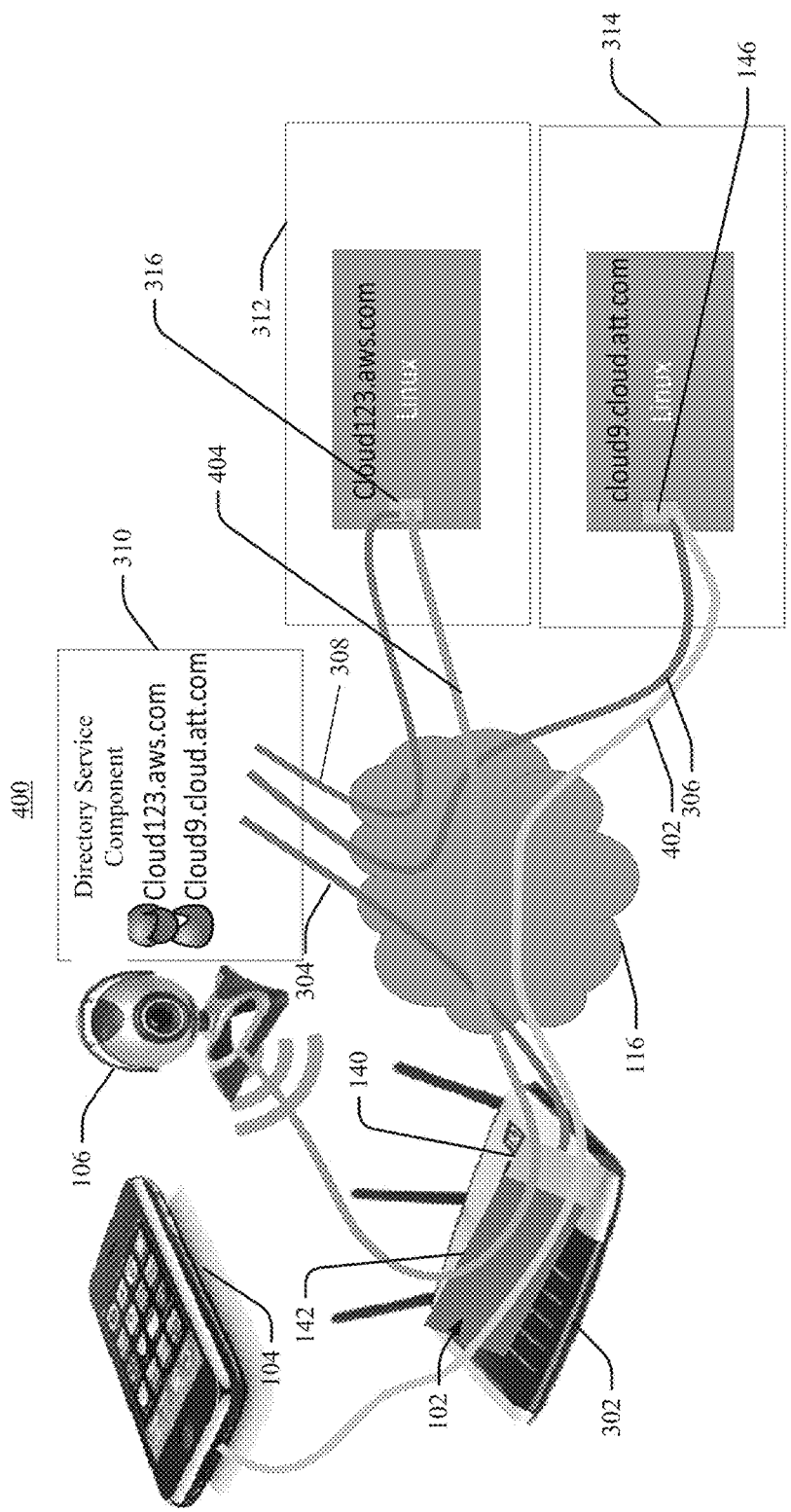
FIG. 4 illustrates an example schematic diagram of a system including the PCCI device and that facilitates communications between physical devices and virtual components in accordance with one or more embodiments described herein.

FIG. 4 illustrates an example schematic diagram of a system including the PCCI device and that facilitates communications between physical devices and virtual components in accordance with one or more embodiments described herein. Repetitive description of like elements employed in other embodiments described herein is omitted for sake of brevity.

In FIG. 4, devices 104, 106 are peripheral devices that are connected to PCCI device 102. The device presents to the end user via an interface (e.g., web, device display, PCCI device display or the like) information identifying one or more host devices (e.g., cloud network host devices, virtual machines or cloud network devices) to which the devices 104, 106 would like to attach. For example, in one embodiment, the cloud host device or cloud network device 312 or the cloud host device or cloud network device 314 can be selected for attachment to device 104 or device 106.

The PCCI device 102 can then build an encrypted tunnel between the PCCI device 102 and the host device PCCI driver 316 (or host device PCCI driver 146), and the host device then can detect the attached device (e.g., either device 104 or device 106) as locally attached to the host device PCCI driver 316 or host device PCCI driver 146. The connection can be maintained until either the device (e.g., device 104, 106) is physically removed from the PCCI device 102, the cloud network host device (or cloud network device) is powered down and/or the end user associated with the device 104 or device 106 removes the association. Unless the end user specifies, or a signal specifying such is received from the device 104 or the device 106, when the device 104 or device 106 or cloud network host device (or cloud network device 126) becomes available, the device (e.g., device 104, device 106) is re-connected to the host device 312 (or the host device 314).

As shown, PCCI device 102 is configured with logic to perform the operations of portions 142, 140. The PCCI device 102 can be attached to the device 104, 106 as shown. In the embodiments shown, the PCCI device 102 is coupled to the device 104 (e.g., an iPhone) and a device 106 (e.g., a camera). The PCCI device 102 can include a directory service component 310 as shown. In some embodiments, the directory service component 310 can be configured to allow an interface for an end user (not shown) of the device 104 and/or the device 106 so that when the peripheral device (e.g., device 104, 106) is connected to the PCCI device 102, the peripheral device can then detect that the peripheral device (e.g., device 104 or device 106) has been attached. From a list of available host devices, which in this case are two links host device, one running on Amazon cloud network search, for example, and one running on a particular cloud network, a particular host device can be selected for a particular device.

The directory service, which can be part of the PCCI device 102 in some embodiments, can then contact the drivers 316, 146 in those respective host devices and can create the tunnel paths 308, 306 so that the device 106 (e.g., camera) and the device contents, from the wireless, are then transmitted as data comes and goes to the driver 316, and so that the driver 316 the host device detects that device 106 is directly connected as a physical device.

The cloud network 9 host device, which may be running Linux, for example, but may also be running windows. In this embodiment, ITunes can install very custom USB drivers for each device and this embodiment can then tunnel the USB physical port protocol over IP in this case (seen as tunnel 402) or the Wi-Fi packets coming and going from the device 106 (e.g., camera) over the IP so that the end device sees the raw devices and is actually treated like a physical driver.

FIGS. 5, 6, 7 and 8 illustrate example schematic diagrams of embodiments of different PCCI drivers that can facilitate communications between physical devices and virtual components in accordance with one or more embodiments described herein. Repetitive description of like elements employed in other embodiments described herein is omitted for sake of brevity.

Figure 6:
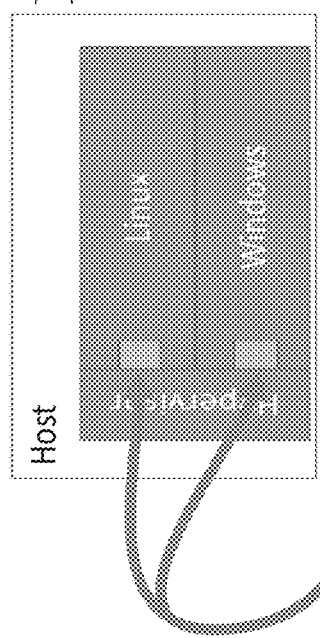
FIGS. 5, 6, 7 and 8 illustrate example schematic diagrams of embodiments of different PCCI drivers that can facilitate communications between physical devices and virtual components in accordance with one or more embodiments described herein.
Figure 5:
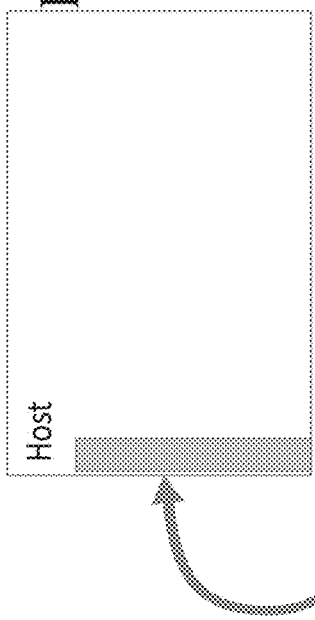
Figure 7:
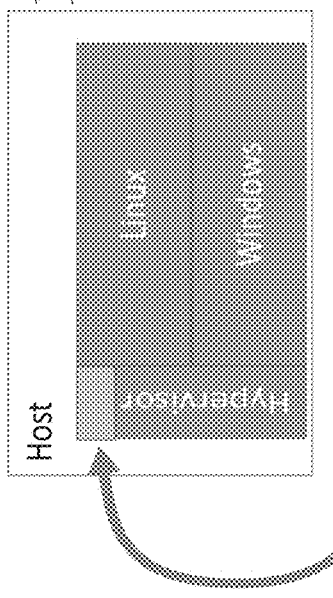

The PCCI driver can be provided at a cloud host device or cloud network device and can be implemented as any number of different embodiments, including, but not limited to, the embodiments shown in FIGS. 5, 6, 7 and/or 8. Implementation of the PC driver can enable the PCCI device 102 to appear as physically connected to the cloud host device or the cloud network device (and vice versa).

FIG. 5 shows a host device 500 including a bare metal driver 502. FIG. 6 shows a host device 500 including a hypervisor 600, Linux OS 602 and Windows OS 604. The native drivers 606, 608 are embedding in an OS instance in each case of OS. The drivers 606, 608 can be installed in each OS (e.g., Linux OS 602, Windows OS 604) and, as such, the embodiment is less secure.

FIG. 7 shows a host device 500 including a hypervisor 600, Linux OS 602 and Windows OS 604. In this embodiment, the hypervisor 600 can include a hypervisor driver 702, and Linux OS 602 and Windows OS 604. However, in this embodiment, the host device 500 can also include a hypervisor driver 702. The hypervisor 600 can handle virtualization and, as a result, this embodiment is very secure.

Figure 8:
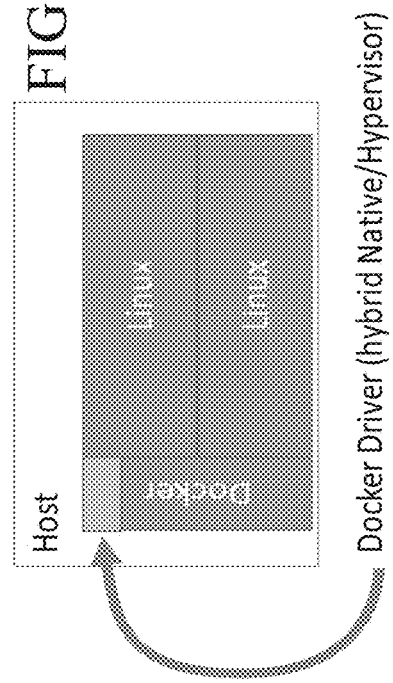

FIG. 8 shows a host device 500 including a container 802 (e.g., docker container), and Linux OSs 602, 804. The container driver 806 (e.g., a hybrid native/hypervisor driver) can be installed in a shared OS kernal and, as a result, can be very secure.

Docker is just one example of a container. Other types of containers can also be employed in one or more embodiments described herein. With the container 802, the inside of the host devices, the actual containers, are generally single applications or single application environments. In some embodiments, we can push a similar driver 806 into the container 802 directly without the host device 500 having to perform processing for the driver 806. As such, one or more (or, in some embodiments, each) of the host devices that are spun up, can take the container (e.g., docker) application and then expose the container application to each of the containers.

In embodiments in which the host device 500 includes a hypervisor 600 that is executing multiple OSs (e.g., Linux OS 602, Windows OS 604 or Linux OSs 602, 804), and host devices under the hypervisor 600, with reference to FIG. 1, the PCCI device 102 can be connected to (e.g., screwed into) the hypervisor 600 so that the host devices themselves, which are already running in a virtualized environment, can detect virtualized components of the host device 500 as physically attached devices from their view. We can say these network devices coming from our machines appear as if they are locally attached to physical devices and then the host devices are treated as devices.

Also, in some embodiments, the embodiment of FIG. 5 in which the bare metal any driver 502 is provided can have the bare metal driver 502 pushed inside the Linux OS and Windows OS (as seen in FIG. 6). Any of the embodiments of FIGS. 5, 6, 7 and 8 can be provided. For example, the bare metal driver 502 can actually push inside the host device in different ways as shown in FIGS. 5, 6, 7 and 8. As such, each one of the devices (e.g., devices 104, 106, 108) connected to the PCCI device 102 can see something different in each embodiment of FIGS. 5, 6, 7 and 8.

Figure 9:
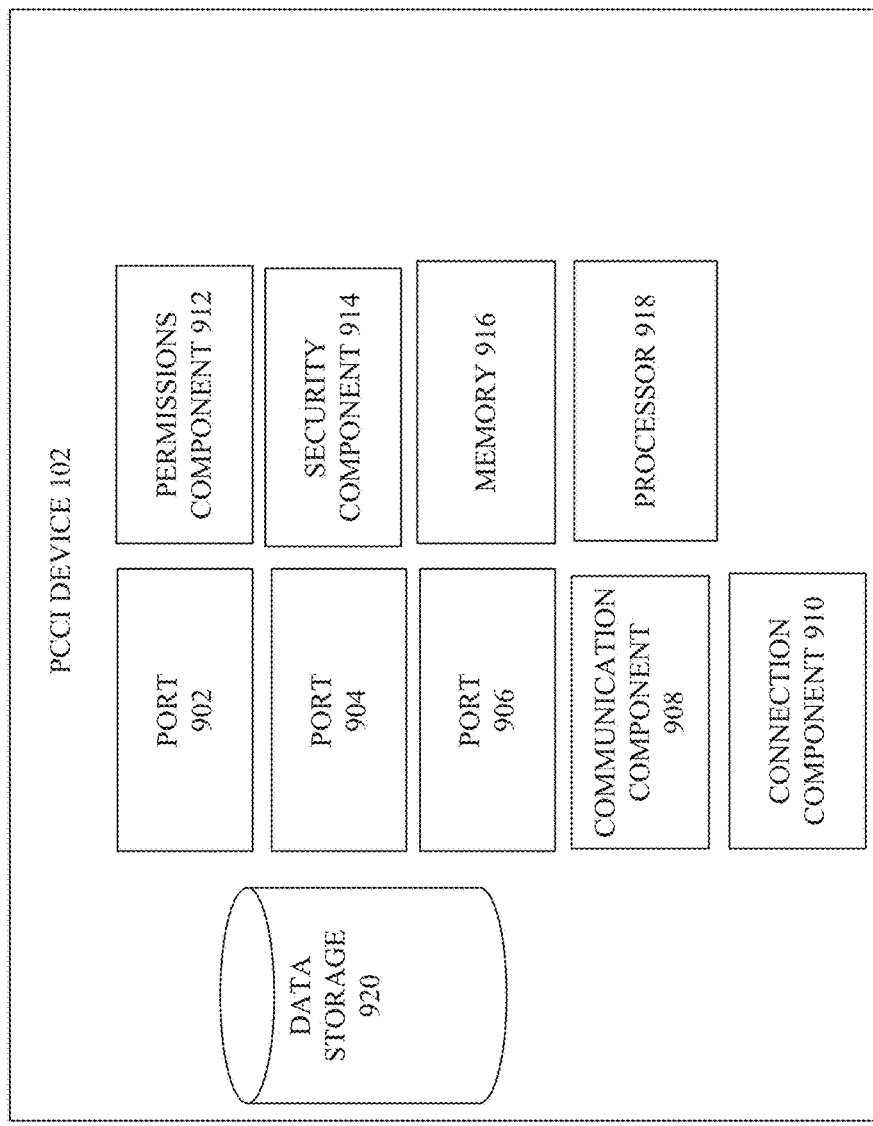
FIG. 9 illustrates an example block diagram of a PCCI device in accordance with one or more embodiments described herein.

FIG. 9 illustrates an example block diagram of a PCCI device in accordance with one or more embodiments described herein. Repetitive description of like elements employed in other embodiments described herein is omitted for sake of brevity.

As shown in FIG. 9, the PCCI device 102 can include ports 902, 904, 906, communication component 908, connectivity component 910, permission component 912, security component 914, memory 916, processor 918 and/or data storage 920. In various embodiments, one or more of the include ports 902, 904, 906, communication component 908, connectivity component 910, permission component 912, security component 914, memory 916, processor 918 and/or data storage 920 can be electrically and/or communicatively coupled to one another to perform one or more functions of the PCCI device 102.

The ports 902, 904, 906 can be physical ports configured to receive connections from one or more peripherals for devices 104, 106, 108. The ports 902, 904, 906 can also be configured to provide connectivity for a tunnel for communication. The tunnel can be a secured tunnel and can be from an output of a port 902, 904, 906 to a driver (e.g., with reference to FIGS. 3 and 4, drivers 316, 146).

The communication component 908 can transmit and/or receive information to and/or from one or more of the devices 104, 106, 108 and/or the cloud host device (e.g., cloud host device 312, 314) or cloud network device (e.g., cloud network device 126) and/or associated with the directory service component (e.g., directory service component 310 of FIG. 3). In various embodiments, the communication component 908 can format the information transmitted according to one or more different protocols. The information can be text, video or any other type of data.

The connectivity component 910 can control the connection between the PCCI device 102 and the cloud host devices 316, 146 or cloud network device. For example, the connectivity component 910 can maintain the connection until the end user device controls the connection to be removed. The permissions component 912 can control the permissions of which cloud host devices and/or devices can have particular types of access to other devices or cloud host devices or peripherals. For example, in one embodiment, the permissions component 912 can control the permissions for a device such that a first device (e.g. device 104) has read/write access to a USB storage device while a second device (e.g., device 106) has only read access from the same USB storage device. The devices 104 and 106 can each be communicatively coupled as if directly connected to the USB storage device via the PCCI device 102.

The security component 914 can provide and/or facilitate one or more security protocols for protecting information transmitted and/or received over the tunnel created by the PCCI device 102. In various embodiments, any number of different security protocols can be provided and/or facilitated via the security component 914. By way of example, but not limitation, the security component 914 can provide the TLF security protocol in some embodiments.

The memory 916 can be a computer-readable storage medium storing computer-executable instructions and/or information configured to perform one or more of the functions described herein with reference to the PCCI device 102. For example, in some embodiments, the memory 916 can store computer-readable storage media associated with constructing a tunnel for communications between a device and a cloud host device, generating security for the tunnel, controlling access based on permissions associated with access by a particular device and the like.

The processor 918 can perform one or more of the functions described herein with reference to the PCCI device 102. The functions can include, but are not limited to, constructing a tunnel for communications between a device and a cloud host device, generating security for the tunnel, controlling access based on permissions associated with access by a particular device and the like. The data storage 920 can store information received from the directory service component 310, the devices 104, 106, 108, cloud host devices 316, 146 or the like.

Figure 10:
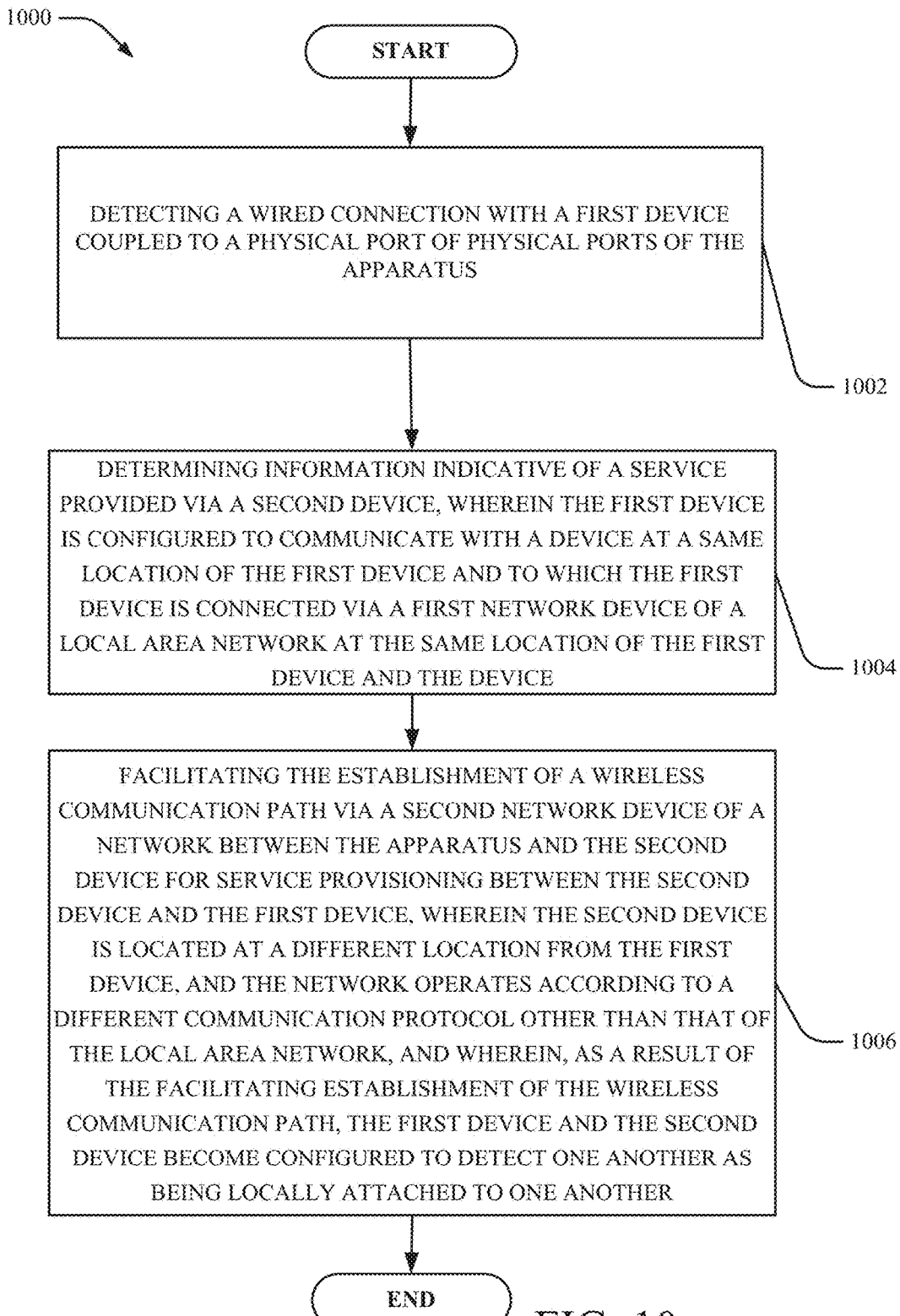
FIGS. 10, 11 and 12 are flowcharts of methods that facilitate communications between physical devices and virtual components in accordance with one or more embodiments described herein.
Figure 11:
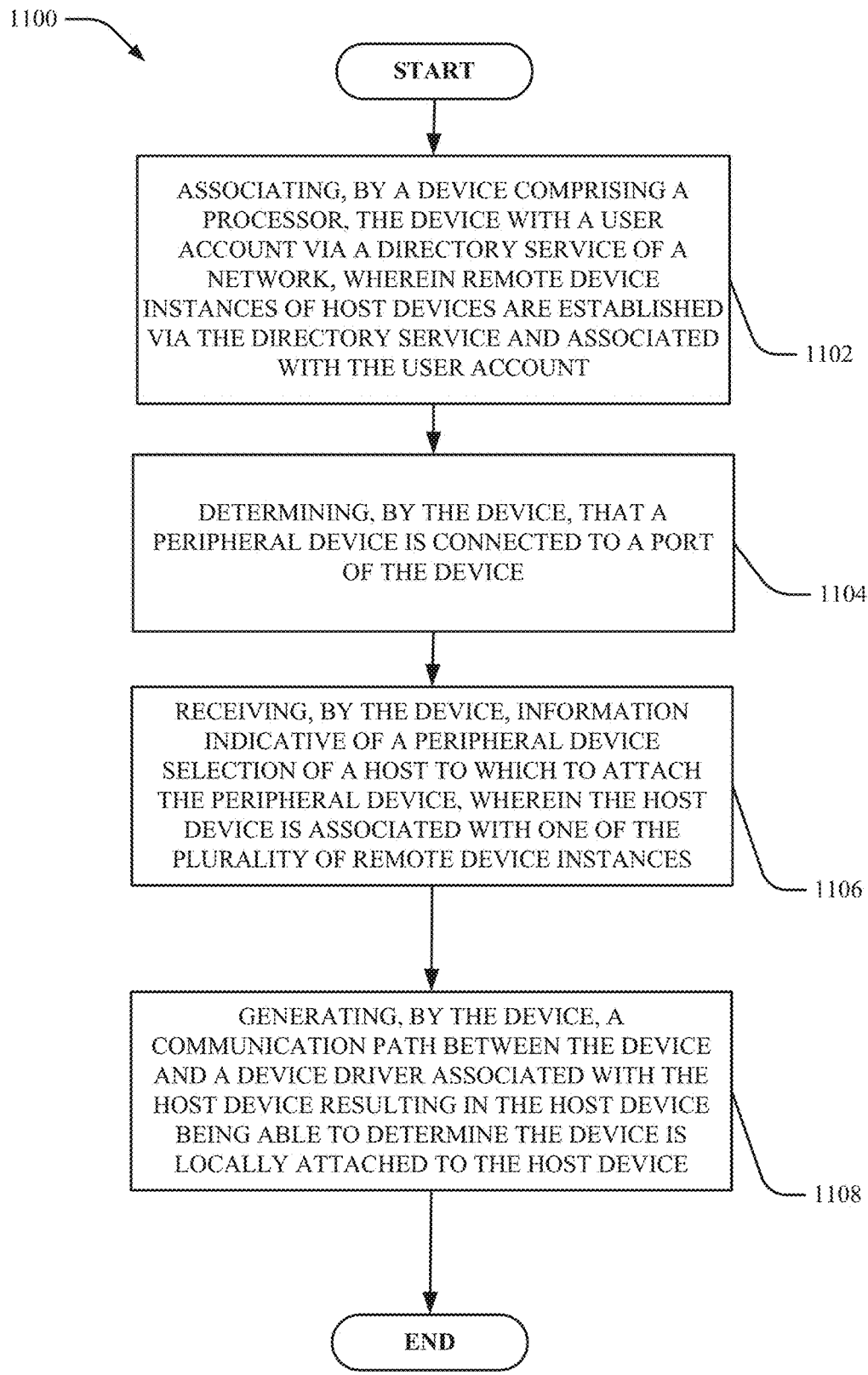
Figure 12:
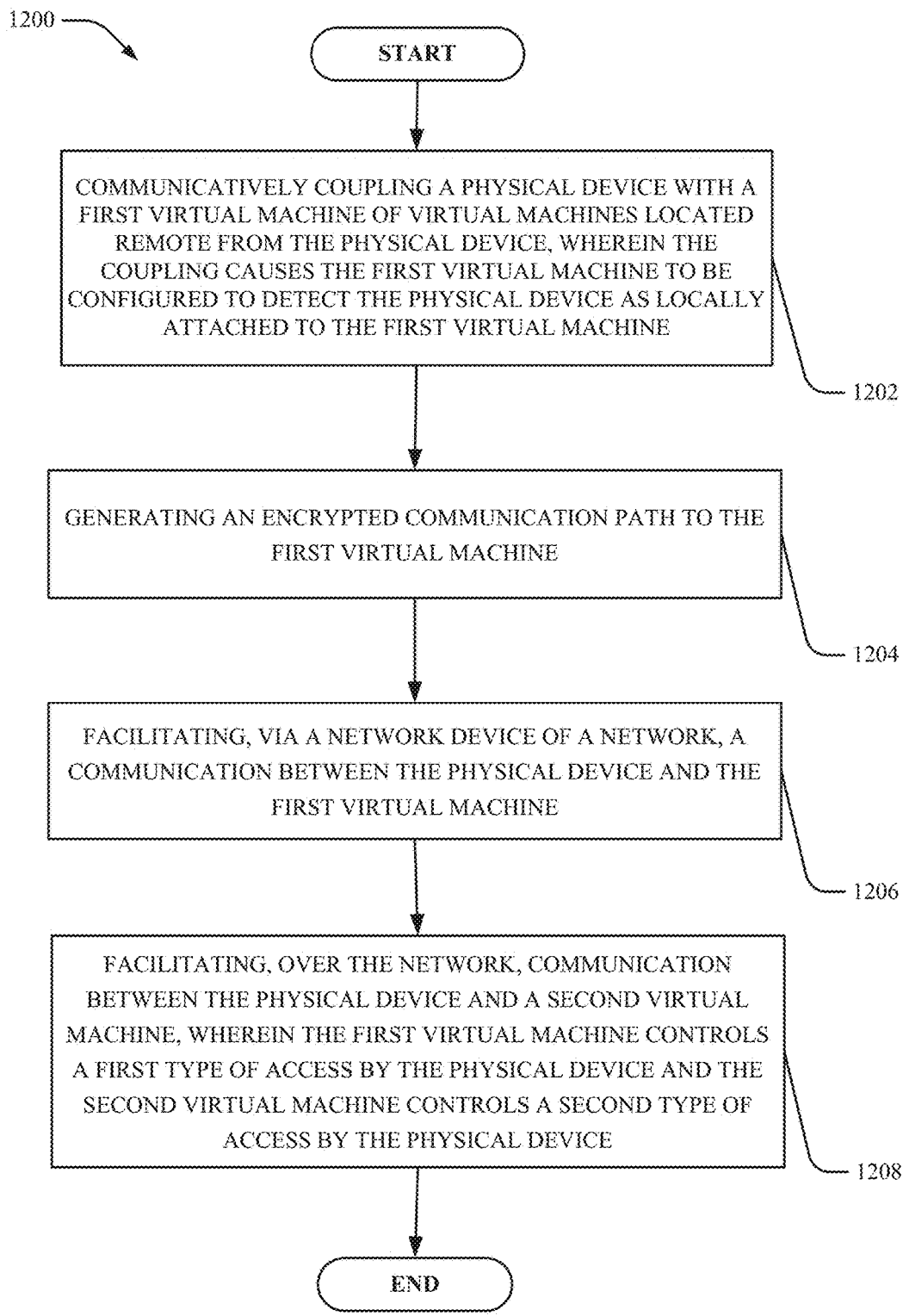

FIGS. 10, 11 and 12 are flowcharts of methods that facilitate communications between physical devices and virtual components in accordance with one or more embodiments described herein. At 1002, method 1000 can include detecting a wired connection with a first device coupled to a physical port of physical ports of the apparatus.

For example, with reference to FIG. 1, the PCCI device 102 can detect an existence of a wired connection with a peripheral device coupled to a physical port (e.g., with reference to FIG. 9, port 902, port 904 or port 906) of the PCCI device 102. The first device can be, for example, device 104, device 106 or device 108. By way of example, but not limitation, the peripheral device can be any number of different devices that can be physically connected to another device via a port including, but not limited to, a scanner, a printer, a mobile phone, an IoT device or the like.

At 1004, method 1000 can include determining information indicative of a service provided via a second device, wherein the first device is configured to communicate with a device at a same location of the first device and to which the first device is connected via a first network device of a local area network at the same location of the first device and the device. For example, the peripheral device can be configured to typically require direct physical connection to another device in order to operate with the device. However, in this embodiment, the service is provided by a second device (e.g., virtual machine or cloud device) that can provide the service over a network to the peripheral device.

In some embodiments, the service comprises a cloud-based application facilitated via the second device. By way of example, but not limitation, the cloud-based application can include those related to or that facilitate data storage or retrieval, file management, web hosting, file sharing and/or software distribution.

At 1006, method 1000 can include facilitating the establishment of a wireless communication path via a second network device of a network between the apparatus and the second device for service provisioning between the second device and the first device, wherein the second device is located at a different location from the first device, and the network operates according to a different communication protocol other than that of the local area network, and wherein, as a result of the facilitating establishment of the wireless communication path, the first device and the second device become configured to detect one another as being locally attached to one another. For example, the PCCI device 102 can generate a communication tunnel between the PCCI device and the second device that provides the service.

A device can consider another device as locally attached (as opposed to remotely attached) over a network based on a number of considerations. For example, a device attached to the PCCI device 102 and connected to a cloud host device can appear as the appropriate physical device to the cloud host device. For example, USB devices physically connected to an actual physical host device must typically respond to setup packets within a defined short period of time (e.g., 50 milliseconds (ms) or 500 ms, depending on the type of packet). The response would contain the configuration of the device (for example, storage, video or communication device). On or after connection to the PCCI device 102, the PCCI device 102 can generate the setup packets to the USB device and store those responses for the duration the USB device is attached. When or after the PCCI device 102 initiates a peripheral connection to a cloud host device, the low level USB packets can be sent to the cloud device driver, which can simulate the connection interrupts to the host device, and then play the setup packet responses from the physical device to the cloud host device, in the timeframe allotted, so it believes it is physically attached. Remotely attached devices are typically operating at a higher level. For example, via remote desktop protocol (RDP), a USB storage device is attached to a remote host as a file system, and a remote printer as a pseudo network printer, not a locally attached device.

In some embodiments, although not shown, method 1000 can also include facilitating, between the first device and the second device, a selected type of access of a plurality of types of access, wherein the selected type of access is based on permission information stored at a directory service component of the apparatus. In some embodiments, although not shown, method 1000 can also include, prior to the facilitating, determining the permission information stored at the directory service component.

In some embodiments, the first device comprises a USB storage device and the selected type of access for the second device is read/write access of the USB storage device. In some embodiments, the first device comprises a USB storage device and the selected type of access is read access of the USB storage device. In some embodiments, the first device comprises a USB storage device and the cloud-based application is associated with a plurality of software applications, wherein a first software application of the plurality of software applications is authorized to have a first type of access to the first device and a second software application of the plurality of software applications is authorized to have a second type of access to the first device. In some embodiments, for example, each software application can be associated with a software container. As such, a first container can have a first type of access and a second container can have a second type of access, as specified in the directory service component.

In some embodiments, the apparatus comprises a first portion having the physical ports and a second portion including a network interface configured to generate an encrypted communication path between the apparatus and another device for transmission of information transmitted via the physical ports. In some embodiments, the physical ports are configured to facilitate communication via a plurality of different protocols (e.g., one or more of the protocols shown in FIG. 2 are examples, although the protocols shown are not an exhaustive set of the possible protocols).

In some embodiments, the apparatus is configured to concurrently provide communications between multiple devices connected to respective ones of the physical ports and respective multiple end devices, wherein the communications are provided over a network and the multiple end devices are located remote from the multiple devices. For example, in some embodiments, the PCCI device 102 can concurrently receive at two different ports, communications from two different peripheral devices. The PCCI device 102 can provide independent communication paths from the different peripheral devices to respective end devices configured to provide one or more of services, information, access to applications or the like.

In some embodiments, the apparatus is associated with (or located within or coupled to) a router. In some embodiments, the apparatus is associated with (or located within or coupled to) a residential gateway.

The second device can be associated with a driver for the apparatus at the location of the second device. For example, the second device can be operably coupled to the driver for the apparatus. By way of further example, the second device can include software that recognizes software providing a driver for the PCCI device 102. The driver for the PCCI device 102 can enable the second device to view the PCCI device 102 as being located at the location of the second device.

The driver can be any number of different types (example drivers are shown in FIG. 5). In some embodiments, the driver for the apparatus comprises a docker container driver. In some embodiments, the driver for the apparatus is a hypervisor driver. In some embodiments, the driver for the apparatus is a bare metal driver. In some embodiments, the driver for the Turning now to FIG. 11, at 1102, method 1100 can include associating, by a device comprising a processor, the device with a user account via a directory service of a network, wherein remote device instances of host devices are established via the directory service and associated with the user account. In some embodiments, the remote device instances are cloud instances. As used herein, the term "cloud instance" can mean a virtual server instance from a cloud network. In cloud instance computing, single hardware can be implemented in software executed on one or computers.

At 1104, method 1100 can include determining, by the device, that a peripheral device is connected to a port of the device. At 1106, method 1100 can include receiving, by the device, information indicative of a peripheral device selection of a host device to which to attach the peripheral device, wherein the host device is associated with one of the plurality of remote device instances. By way of example, but not limitation, the peripheral device can receive or detect a selection of a host device. For example, the selection can be made via a selection to at an interface of the peripheral device. One selection can be a user selection at a user interface. In another embodiment, other selections can be made via profile information previously stored in the peripheral device and/or via a signal received at the peripheral device.

At 1108, method 1100 can include generating, by the device, a communication path between the device and a device driver associated with the host device resulting in the host device being able to determine the device is locally attached to the host device. The communication path can be a secured, encrypted communication path in some embodiments.

In some embodiments, although not shown, the method 1100 can also include maintaining, by the device, the communication path until the peripheral device is physically removed from the port of the device. In other embodiments, although also not shown, the method can include maintaining, by the device, the communication path until the host device is powered down or the peripheral device sends a signal to the PCCI device 102 to remove the association between the peripheral device and the host device.

In some embodiments, although not shown, the method 1100 can also include disconnecting, by the device, the connection between the device and the device driver associated with the host device based on determination that a criterion for disconnection of the connection is satisfied. The method 1100 can also include re-connecting, by the device, the connection based on a determination that the peripheral device has become available.

Turning now to FIG. 12, at 1202, method 1200 can include communicatively coupling a physical device with a first virtual machine of virtual machines located remote from the physical device, wherein the coupling causes the first virtual machine to be configured to detect the physical device as locally attached to the first virtual machine. At 1204, method 1200 can include generating an encrypted communication path to the first virtual machine. At 1206, method 1200 can include facilitating, via a network device of a network, a communication between the physical device and the first virtual machine.

In some embodiments, at 1208, method 1200 can include facilitating, via the network device, another communication between the physical device and a second virtual machine, and wherein the first virtual machine controls a first type of access by the physical device and the second virtual machine controls a second type of access by the physical device.

Figure 13:
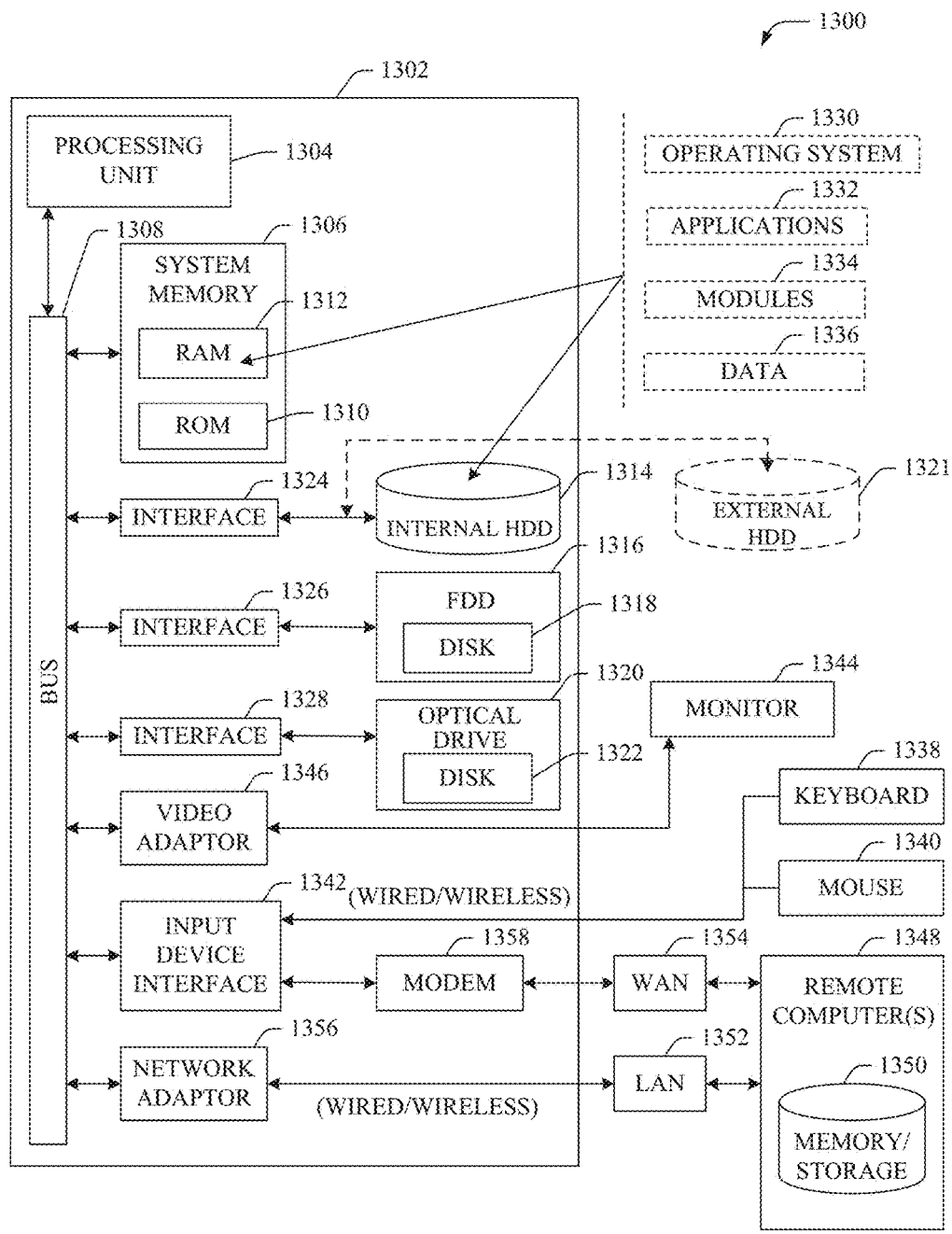
FIG. 13 illustrates a block diagram of a computer that can be employed in accordance with one or more embodiments.

FIG. 13 illustrates a block diagram of a computer that can be employed in accordance with one or more embodiments. Repetitive description of like elements employed in other embodiments described herein is omitted for sake of brevity.

In some embodiments, the computer, or a component of the computer, can be or be included within any number of components described herein comprising, but not limited to, PCCI device 102, devices 104, 106, 108, virtual machine 120, directory service component 310, (or a component of PCCI device 102, devices 104, 106, 108, virtual machine 120 or directory service component).

In order to provide additional text for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable (or machine-readable) storage media and/or communications media, which two terms are used herein differently from one another as follows. Computer-readable (or machine-readable) storage media can be any available storage media that can be accessed by the computer (or a machine, device or apparatus) and includes both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1310 (e.g., EIDE, SATA), which internal hard disk drive 1314 can also be configured for external use in a suitable chassis (not shown), a magnetic floppy disk drive 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1302, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A communication device can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless AP disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier (s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable (or machine-readable) storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
 a processor; and
 a memory that stores executable instructions that, when executed by the processor, perform operations, comprising:
  detecting a wired connection with a first device coupled to a physical port of physical ports of the apparatus;
  determining information indicative of a service provided via a second device, wherein the first device is configured to communicate with a third device at a same location of the first device and to which the first device is connected via a first network device of a local area network at the same location of the first device and the third device; and establishing a wireless communication path via a second network device of a network between the apparatus and the second device for service provisioning between the second device and the first device, wherein the second device is located at a different location from the first device, wherein the network operates according to a different communication protocol other than that of the local area network, and wherein, as a result of the establishment of the wireless communication path, the first device and the second device become configured to detect one another as being locally attached to one another, wherein the service comprises an application that is executing at least partly on the second network device and is provided via the second device, and wherein the operations further comprise:

determining, between the first device and the second device, a selected type of access of types of access, and wherein the selected type of access is based on permission information stored by a directory service of the apparatus; and prior to the determining between the first device and the second device, determining the permission information stored by the directory service.

2. The apparatus of claim 1, wherein the first device comprises a universal serial bus storage device and the selected type of access for the second device is read and write access of the universal serial bus storage device.

3. The apparatus of claim 1, wherein the first device comprises a universal serial bus storage device and the selected type of access is read access of the universal serial bus storage device.

4. The apparatus of claim 1, wherein the first device comprises a universal serial bus storage device and the application is associated with software applications, and wherein a first software application of the software applications is authorized to have a first type of access to the first device and a second software application of the software applications is authorized to have a second type of access to the first device.

5. The apparatus of claim 1, wherein the establishing the wireless communication path comprises establishing an encrypted wireless communication path for an encrypted communication between the apparatus and the second device, and wherein the encrypted communication is protected from access by the first device.

6. The apparatus of claim 1, wherein the apparatus comprises a first portion comprising the physical ports and configured to transmit information via the physical ports, and a second portion comprising a network interface configured to generate an encrypted communication path between the apparatus and the second device, and wherein the information is unencrypted.

7. The apparatus of claim 6, wherein the physical ports are configured to facilitate communication via different communication protocols.

8. The apparatus of claim 1, wherein the operations further comprise:

concurrently providing communications between multiple devices connected to respective ones of the physical ports and respective multiple end devices, and wherein the communications are provided via network devices of the network and the multiple end devices are located remote from the multiple devices.

9. The apparatus of claim 1, wherein the first device comprises a scanner.

10. The apparatus of claim 1, wherein the second device is associated with a driver for the apparatus at the different location of the second device.

11. The apparatus of claim 10, wherein the driver for the apparatus comprises a docker container driver.

12. The apparatus of claim 10, wherein the driver for the apparatus is a hypervisor driver.

13. A method, comprising:

detecting, by a device comprising a processor, a wired connection with a first device coupled to a physical port of physical ports of the apparatus;

determining, by the device, information indicative of a service provided via a second device; and establishing, by the device, a wireless communication path via a network device of a network between the device and the second device for service provisioning between the second device and the first device, wherein the second device is located at a different location from the first device, wherein the network operates according to a different communication protocol other than that of the local area network, and wherein, as a result of the establishing the wireless communication path, the first device and the second device become configured to detect one another as being locally attached to one another, wherein the service comprises an application that is executing at least partly on the network device and is provided via the second device;

providing, by the device, between the first device and the second device, a selected type of access of types of access, and wherein the selected type of access is based on permission information stored by a directory service of the apparatus; and prior to the providing, determining, by the device, the permission information stored by the directory service.

14. The method of claim 13, wherein the first device comprises a universal serial bus storage device and the selected type of access for the second device is read and write access of the universal serial bus storage device.

15. The method of claim 13, wherein the first device comprises a universal serial bus storage device and the selected type of access is read access of the universal serial bus storage device.

16. A non-transitory machine-readable storage medium, comprising executable instructions that, when executed by a processor, facilitate performance of operations, comprising:

detecting a wired connection with a first device coupled to a physical port of physical ports of the apparatus;

determining information indicative of a service provided via a second device; and establishing a wireless communication path via a network device of a network for service provisioning between the second device and the first device, wherein the second device is located at a different location from the first device, wherein the network operates according to a different communication protocol other than that of the local area network, and wherein, as a result of the establishing the wireless communication path, the first device and the second device become configured to detect one another as being locally attached to one another, wherein the service comprises an application that is executing at least partly on the network device and is provided via the second device;

determining between the first device and the second device, a selected type of access of types of access, and wherein the selected type of access is based on permission information stored by a directory service of the apparatus; and prior to the determining between the first device and the second device, determining the permission information stored by the directory service.

17. The non-transitory machine-readable storage medium of claim 16, wherein the first device comprises a universal serial bus storage device and the selected type of access for the second device is read and write access of the universal serial bus storage device.

* * * * *